March 13, 1934. P. HOGAN 1,950,678
TOOL FOR REDUCING THE ENDS OF TUBES OF DUCTILE METAL
Filed May 3, 1932 2 Sheets-Sheet 1
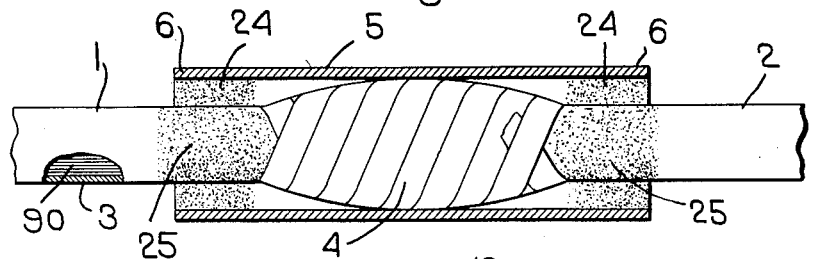
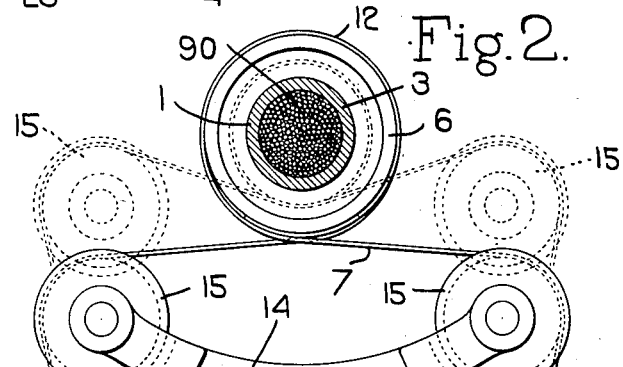
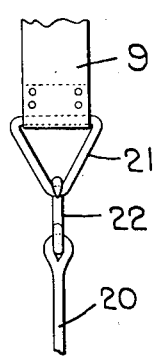
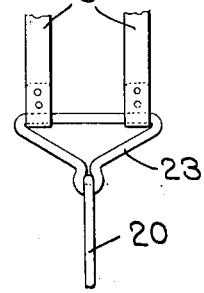
Inventor.
Philip Hogan
by Heard Smith & Tennant.
Attys.

March 13, 1934.    P. HOGAN    1,950,678
TOOL FOR REDUCING THE ENDS OF TUBES OF DUCTILE METAL
Filed May 3, 1932    2 Sheets-Sheet 2
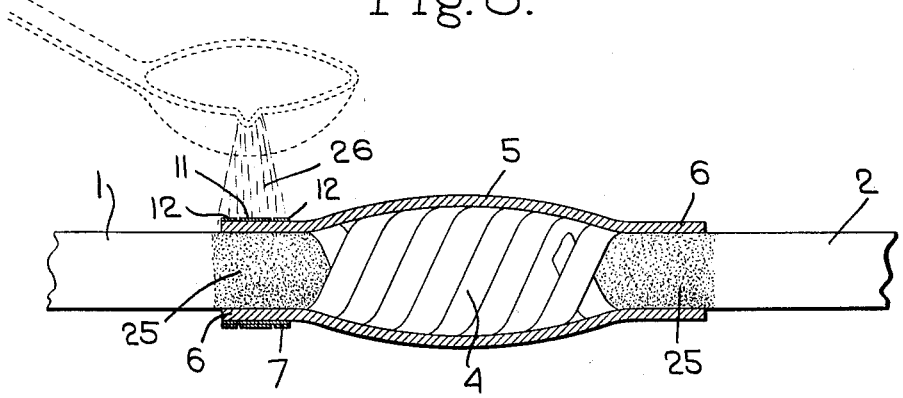
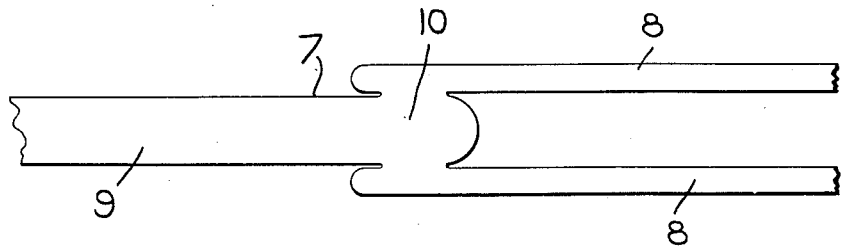
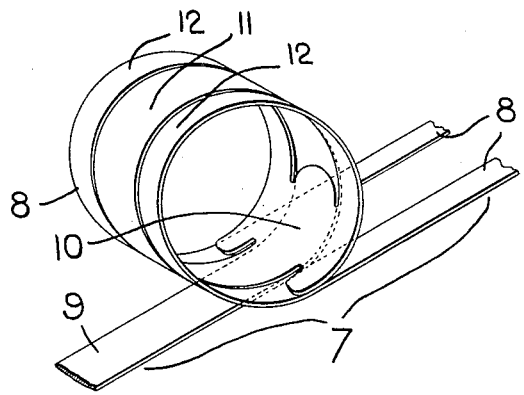
Inventor.
Philip Hogan
by Heard Smith & Tennant.
Attys.

Patented Mar. 13, 1934

1,950,678

UNITED STATES PATENT OFFICE 1,950,678

TOOL FOR REDUCING THE ENDS OF TUBES OF DUCTILE METAL

Philip Hogan, Newton, Mass.

Application May 3, 1932, Serial No. 608,998

9 Claims. (Cl. 153—79)

This invention relates to a device for reducing the ends of a tube of lead or similar ductile metal and while it is capable of a wide variety of uses I have chosen herein to illustrate it as it might be used in reducing the ends of a lead sleeve used in splicing the ends of lead-covered transmission cables whether used as communication lines or power transmission lines.

In splicing the ends of two lead-covered cables it is the common practice to first splice together the ends of the wire constituting the cable, then to place a lead sleeve over the splice and reduce the diameter of the sleeve at its ends to fit the lead sheaths of the two cables and then to solder the reduced ends of the sleeve to the lead sheaths.

The tool which is hereto illustrated is specially designed for thus reducing the ends of the lead sleeve, although it is equally applicable for other purposes.

In the drawings which show one embodiment of the invention, Fig. 1 is a sectional view showing a step in the process of splicing the ends of two cables, each having a lead sheath;

Fig. 2 is a sectional view through a tool embodying my invention and showing it in operation;

Figs. 3 and 4 show the detachable connections for the ends of the flexible member;

Fig. 5 is a view showing the lead sheath after the ends thereof have been reduced in diameter;

Fig. 6 is a view illustrating the flexible member which encircles the end of the sleeve and by which the sleeve end is reduced in diameter;

Fig. 7 is a view showing the flexible member in its operative condition;

While, as stated above, the invention is capable of general use wherever it is desired to reduce the size of a tube of lead or other ductile material, yet for the purpose of describing and illustrating the invention I have shown it as it might be used in reducing the size of the ends of the lead sleeve used in forming the sealed joint when a splice is made in a transmission cable.

In the drawings, 1 and 2 indicate the ends of two lead-covered transmission cables which are being spliced together, each cable comprising a plurality of wires 90 enclosed in a lead sheath 3. In splicing together the ends of two cables the lead sheath is stripped from the wires for a suitable distance and then the individual wires 90 of one cable are spliced to the corresponding wires of the other cable and the spliced wires are then usually wound with a tape 4 of insulating material. In completing the joint a lead sleeve 5 is placed over the splice and the ends of the lead sheath are then soldered to the sheath 3 of each of the cables 1 and 2.

The lead sleeve 5 is somewhat larger in diameter than the cables and in order to make a soldered joint the ends 6 of the sleeve are first reduced in diameter to bring them into contact with the lead sheaths and then the soldered joint is made.

The tool with which the present invention is concerned is adapted to thus reduce the ends 6 of the lead sleeve 5 so as to bring said ends into contact with the sheaths 3 of the cable as shown in Fig. 5. This tool comprises a flexible member adapted to be looped around the ends 6 of the sleeve 5 together with means acting on the flexible member to reduce the size of the loop and thereby contract the sleeve end radially. The flexible member is indicated at 7 and it is bent to form a loop adapted to encircle the end 6 of the sleeve 5.

This flexible member may be made in various ways and of any desirable material. In the preferred form of many invention, which is that herein illustrated, it is made of a ribbon-like strip of metal, one end of which is bifurcated, and thus presents twin sections, and the other end of which is of a width to fit between the arms of the bifurcated end. Fig. 6 illustrates this flexible member and one end of it is made with the twin sections comprising the two arms or legs 8 and the other end with the single strap-like member 9 which is of a width to be received between the legs 8. At its center portion 10 the flexible member is of a width equal to the combined width of the two arms 8 and the single portion 9 and the arms 8 extend from one end of the center portion 10 while the member 9 extends from the other end thereof.

As stated above, this flexible member 7 is formed into a loop which encircles the end 6 of the sleeve 5. In forming this loop the single end 9 of the flexible member is bent to form the loop 11 and is then passed between the arms or legs 8 and outside of the center portion 10. The arms or legs 8 are bent to form the loops 12, said arms also passing outside of the central portion 10 of the flexible member. There will thus be formed a loop as shown in Fig. 7 which consists of the two loops 12 formed in the legs 8 and the central loop 11 formed in the portion 9, the legs 8 extending from the loop in one direction and the portion 9 extending from the loop in the opposite direction.

This loop formed of the three loops 11, 12, 12 encircles the end 6 of the sleeve 5 and means are provided for reducing the size of the loop thereby reducing the size of the sleeve.

I have shown in Fig. 2 a device adapted to be used for reducing the size of this loop. Such device comprises a body portion 13 in the form of a tube, to one end of which the ends of the flexible member 7 are secured, and a yoke member 14 carrying at its ends rolls 15 over which the flexible member extends together with means for producing a separating movement between the yoke 14 and the body portion 13. The yoke 14 is shown as having a stem 16 which telescopes into one end of the tubular body 13 and an operating screw 17 is screw threaded into the other end of the body 13, said screw having a handle or head 18 by which it may be turned. The screwing of the member 17 into the body 13 will force the yoke 14 upwardly thus carrying the rolls 15 toward the dotted line position. Since the ends of the flexible member 7 are anchored to the body 13 this movement of the rolls 15 toward the dotted line position will result in reducing the diameter of the loop thereby reducing the diameter of the end 6 of the sleeve. Owing to the manner in which the loop is formed the center lines of the pulling strain on the two ends of the loop will be in line with each other and at right angles to the axis of the tubular member. Thus the pulling strain on the ends of the loop by which the loop is reduced in diameter does not tend to twist the loop.

Any appropriate way of connecting the ends of the flexible member 7 to the body 13 may be employed. As herein shown said body 13 has at its outer end two lugs 19 to which straps 20 are secured and the ends of these straps are detachably connected to the ends of the flexible connection 7. The portion 9 of the flexible connection 7 has at its end a loop 21 and the corresponding strap 20 is provided with a hook 22 to hook into this loop. The ends of the two legs 8 are connected to a loop 23 to which the end of the other strap 20 is secured either by means of a hook or otherwise.

When the tool is used for splicing cables the soldering of the sleeve to the lead sheath may be accomplished in any appropriate way. In the drawings I have illustrated the interior of the ends 6 of the sleeve as being provided with a coating of solder 24 and the exterior of each lead sheath at the end as being provided with a coating of solder 25. These solder coatings are applied before the sleeve is assembled with the cables. The tool is then applied to each end 6 of the sleeve in turn and is operated to reduce said end and bring it into contact with the lead sheath as shown in Fig. 5. When the end of the sleeve has been reduced in diameter sufficiently to bring it into contact with the lead sheath of the cable then heat is applied to fuse the solder material 24, 25 thereby producing the soldered joint.

Such heat may be applied in any approved way. One convenient way is to pour over the joint a hot liquid 26 such as melted paraffin or hot oil which has a temperature higher than the fusing point of the solder material 24, 25. When the solder has become melted then the screw 17 is given an extra turn to apply additional pressure to the sleeve, which pressure is maintained until the solder cools.

I claim:

1. A tool for reducing the diameter of a tubular member of ductile material comprising a flexible member, one end of which is bifurcated, said member being adapted to be looped about the tubular member with the non-bifurcated end inserted between the arms of the bifurcated end, and means for acting on said loop to reduce the diameter thereof, thereby reducing the diameter of the tube encircled by the loop.

2. A tool for reducing the diameter of a tubular member of ductile material, said tool comprising a flexible member, one end of which presents two arms spaced from each other and the other end of which is of a width to be received between said arms, said member being adapted to be looped about the tubular member with the latter end passed between the arms, and means for acting on said flexible member either side of said loop to reduce the diameter thereof.

3. A tool for reducing the diameter of a tubular member of ductile material, said tool comprising a flexible member, one end of which is bifurcated and the other end of which is of a width to be received between the legs of the bifurcated portion, both the bifurcated end and the other end of said member adapted to be looped about the tubular member with the non-bifurcated end lying between the legs of the bifurcated end, and means to act on said flexible member to reduce the diameter of the loop.

4. A tool for reducing the diameter of a tubular member of ductile material comprising a flexible band, one end of which presents twin sections and the other end of which presents a single section of a width approximating the distance between the twin sections, said band being adapted to be looped about the tubular member with the single section end passed between the twin sections, and with the portions of the twin section and single section adjacent said loop extending in opposite directions, and means for acting on said portions of the flexible band to reduce the diameter of the loop thereby reducing the diameter of the tube encircled by the loop.

5. A tool for reducing the diameter of a tubular member of ductile material comprising a flexible band, one end of which presents twin sections having a parallel relation and equally spaced from the median longitudinal line of said band and the other end of which presents a centrally-situated single section of a width to be passed between the twin sections, said flexible band being adapted to be looped about the tubular member with the single section inserted between the twin sections, and means for acting on said loop to reduce the diameter thereof thereby reducing the diameter of the tube encircling the loop.

6. A tool for reducing the diameter of a tubular member of ductile material comprising a flexible band, one end of which presents separated twin sections and the other end of which presents a single section of a width to pass between the twin sections, each section being looped once about the tubular member, and means for acting on said member to reduce the diameter of the loops thereby reducing the diameter of the tube encircled by the loops.

7. A tool for reducing the diameter of a tubular member of ductile material comprising a flexible band having a bifurcated portion and a non-bifurcated portion, each portion being adapted to be looped once about the tubular member with the loop formed in the non-bifurcated portion occupying a position between the loops formed by the arms of the bifurcated portion, and means for acting on said band to reduce the diameter of the loops thereby reducing the diameter of the tube encircled by the loop.

8. A tool for reducing the diameter of a tubular member of ductile material comprising a tubular body member, a yoke member carried thereby and provided with two guide rolls, a flexible band, one part of which presents twin sections spaced from each other and the other part of which presents a single section of a width approximating the spacing between the twin sections, said band being formed into a loop to entirely encircle the tubular member with the single section passed between the twin sections, and with said sections passing over said rolls and connected to the body portion, the portions of the twin sections and of the single section between the rolls and the loop extending in opposite directions, and means to produce a relative movement between the yoke member and the body member by which the rolls apply a force to the flexible band tending to reduce the diameter of said loop.

9. A tool for reducing the diameter of a tubular member comprising a flexible band, one end of which is bifurcated and the other end of which is of a width to pass between the arms of the bifurcated end, said band being formed into a loop to entirely encircle the tubular member to be reduced and having the non-bifurcated end passing between the arms of the bifurcated end and extending in opposite directions to said arms, means to apply a pulling strain to said crossed ends to reduce the diameter of the loop and thereby reduce the diameter of the tubular member.

PHILIP HOGAN.